United States Patent [19]
Tanimura

[11] 3,953,586
[45] Apr. 27, 1976

[54] PROCESS FOR PURIFYING GASES CONTAINING $H_2S$

[76] Inventor: Waichi Tanimura, No. 836, Okazu-cho, Tozuka, Yokohama, Kanagawa, Japan

[22] Filed: Dec. 5, 1973

[21] Appl. No.: 421,928

[30] Foreign Application Priority Data
Dec. 15, 1972  Japan............................... 47-125153

[52] U.S. Cl. ............................................... 423/575
[51] Int. Cl.² ........................................ C01B 17/04
[58] Field of Search...................... 423/575, 574, 222

[56] References Cited
UNITED STATES PATENTS

| | | | |
|---|---|---|---|
| 1,900,398 | 3/1933 | Jacobson | 423/574 X |
| 3,103,411 | 9/1963 | Fuchs | 423/575 X |
| 3,793,440 | 2/1974 | Schulze | 423/575 X |

FOREIGN PATENTS OR APPLICATIONS

| | | | |
|---|---|---|---|
| 1,240,753 | 7/1971 | United Kingdom | 423/575 |
| 870,510 | 12/1941 | France | 423/575 |

*Primary Examiner*—G. O. Peters
*Attorney, Agent, or Firm*—Wenderoth, Lind & Ponack

[57] ABSTRACT

A process for purifying gases containing $H_2S$ and preparing, at the same time, elementary sulfur which comprises dissolving $H_2S$ from gases containing $H_2S$ or $H_2S$ and a small amount of $SO_2$ in an organic solvent, reacting said solvent having $H_2S$ dissolved therein with an organic solvent having $SO_2$ dissolved therein under conditions to produce a precipitate of elemental sulfur in the organic solvent which also contains unreacted $H_2S$; separating the $H_2S$ from the solvent and converting the $H_2S$ to $SO_2$ by oxidation and allowing a part of the recovered solvent to absorb $SO_2$ which is returned to the process.

3 Claims, 1 Drawing Figure

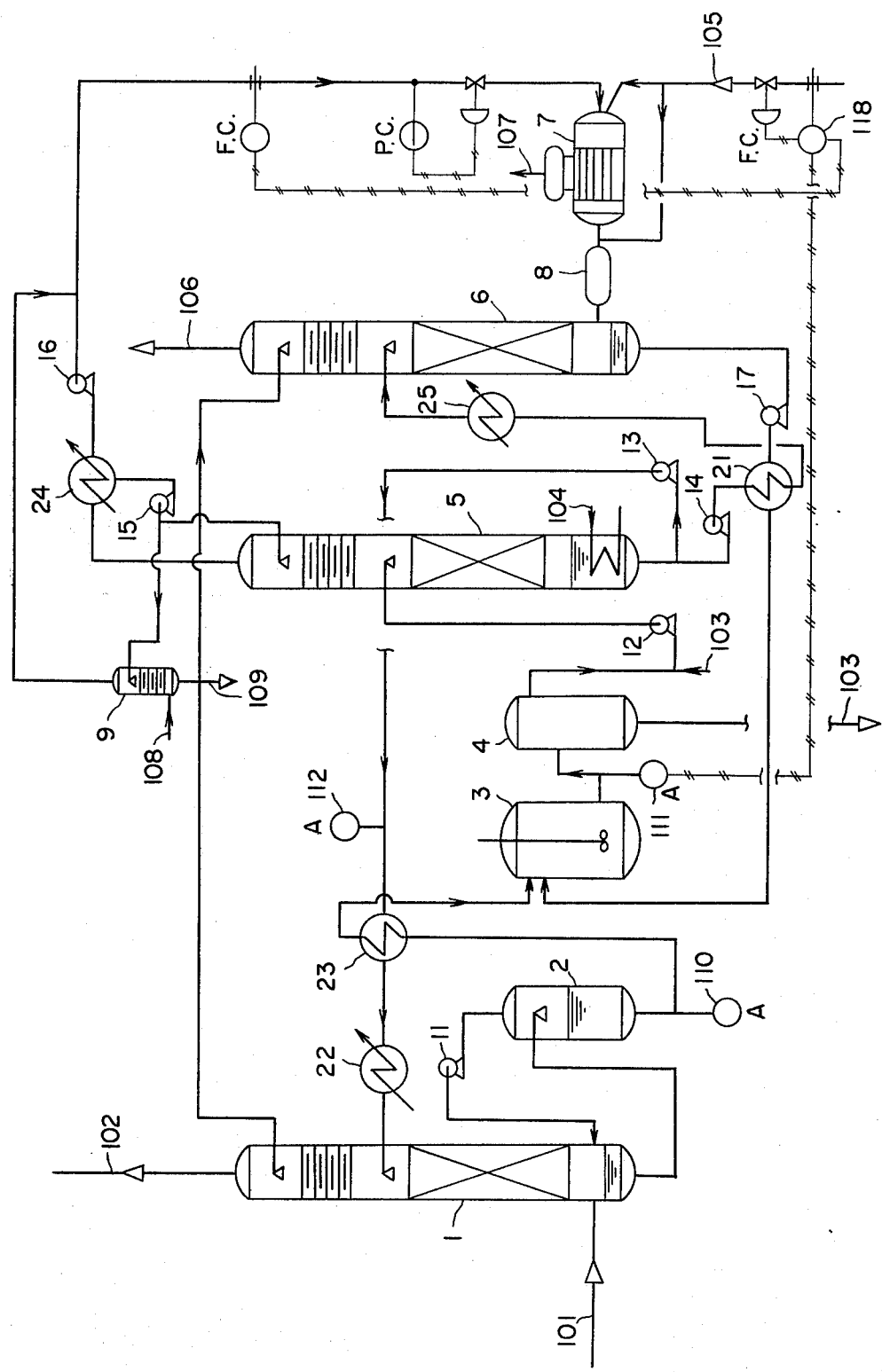

PROCESS FOR PURIFYING GASES CONTAINING H₂S

BACKGROUND OF THE INVENTION a. Field of the Invention

The present invention relates to a process for purifying gases containing $H_2S$ or $H_2S$ and a small amount of $SO_2$ and preparing, at the same time, elemental sulfur.

b. Description of the Prior Art

With regard to desulfurization of sulfur-containing petroleum fuels, it has been recently disclosed that a method to desulfurize the fuels at petroleum refining plants is preferable to desulfurizing after burning the fuels or so-called stack gas desulfurization as a measure to eliminate environmental pollution caused by sulfur oxides. For the desulfurization of petroleum fuels, hydrogenating desulfurization is generally adopted. For such petroleum fractions to which this method cannot economically applied, a variety of gasificating desulfurization methods have been proposed. In either method, however, sulfur compounds removed are separated from the fuels in the form of hydrogen sulfide or sulfur dioxide. Ordinarily, desulfurizaton is conducted by hydrogenating sulfur in the fuel into hydrogen sulfide, extracting this hydrogen sulfide with solvent, releasing concentrated hydrogen sulfide, and producing sulfur by allowing the hydrogen sulfide to react with sulfur dioxide obtained by burning a part of the hydrogen sulfide by the Claus furnace process. The exhaust gas from this process, however, does not meet the requirements of the pollution prevention regulations since it still contains unreacted hydrogen sulfide and sulfur dioxide. Therefore, disposition of such tail gas containing hydrogen sulfide and sulfur dioxide at present requires more equipment and operating costs than the Claus furnace process.

As a means to solve such problem, the Townsend process has been proposed, which is a process that eliminates the Claus furnace process and serves to dispose of tail gas. To be more precise, it is a closed cycle process that does not release sulfur compounds into the atmosphere, by producing sulfur in a solvent into which hydrogen sulfide coexisting with fuel gas has been extracted. This process is described hereunder in further detail. Ethylene glycols are used as the solvent. Sulfur is precipitated by allowing an absorbing liquid prepared by causing sulfur dioxide to be absorbed by said solvent to react with hydrogen sulfide in the fuel gas in an absorbing column. This reaction that produces sulfur by allowing hydrogen sulfide to react with sulfur dioxide in solvent requires much time. Besides this solvent does not absorb hydrogen sulfide well. For these reasons, it is very difficult to reduce hydrogen sulfide in the fuel gas to a small amount. That is, it is not possible to reduce it to a small amount within ordinary retention time during which solvent passes through the absorbing column. In other words, it is difficult for the absorbing column to provide enough time to effect chemical reaction between hydrogen sulfide and sulfur dioxide in solvent. Furthermore, this solvent does not absorb hydrogen sulfide well, as mentioned before. Accordingly, it becomes necessary to circulate a large quantity of liquid to desulfurize the fuel gas to a degree in compliance with present pollution prevention regulations.

In this process, sulfur dioxide is prepared by burning sulfur produced or untreated hydrogen sulfide, which results in low efficiency since sulfur that is to be recovered as a product and other fuel gases than hydrogen sulfide are also burnt. In addition, this process requires costly equipment since acidic solutions are used in many parts thereof because the solvent having absorbed sulfur dioxide is circulated therethrough. Particularly, the part in which the solvent is purified by releasing sulfur dioxide at high temperature must be made of special materials that are costly.

SUMMARY OF THE INVENTION

An object of the present invention is to purify gases containing $H_2S$ or $H_2S$ and a small quantity of $SO_2$ and, at the same time, to produce elemental sulfur. Another object of the invention is to provide a process for stabilizing sulfur compounds that do not pollute atmosphere and water by formulating a cyclic process of operation.

That is, the present invention is concerned with a process for preparing sulfur by continuously removing sulfur compounds from a gas stream containing $H_2S$ or $H_2S$ and a small quantity of $SO_2$ which comprises: (1) bringing into contact a gas stream containing $H_2S$ with a stream of organic solvent that dissolves $H_2S$ and $SO_2$ well, so as to remove the $H_2S$ from said gas stream; (2) mixing most or all of the solvent stream discharged from step (1) and a stream of organic solvent containing $SO_2$ under reaction conditions so selected as to produce elemental sulfur and a stream of organic solvent containing dissolved, unreacted $H_2S$; (3) separating the solvent stream containing dissolved $H_2S$ of step (2) from the elemental sulfur; (4) separating the organic solvent stream containing dissolved $H_2S$ from step (3) into a stream of gas containing $H_2S$ and a stream of organic solvent free of $H_2S$ and returning a part of said organic solvent stream free of $H_2S$ to the step (1); (5) oxidizing the gas stream containing $H_2S$ from step (4) under oxidizing conditions so as to produce $SO_2$; and (6) contacting the gas stream containing $SO_2$ from step (5) with a part of the organic solvent free of $H_2S$ from step (4) to produce a stream of purified gas free of $SO_2$ and a stream of organic solvent containing dissolved $SO_2$.

In the conventional processes there are employed organic solvents that poorly dissolve $H_2S$. Therefore, an organic solvent that has absorbed $SO_2$ is used to absorb $H_2S$. By thus allowing $H_2S$ to react with $SO_2$ in the solvent, water and sulfur are produced and $SO_2$ is consumed. This chemical reaction is used to promote the dissolution of $H_2S$ into organic solvent. Because of this, $H_2S$ cannot be completely removed in an ordinary absorption column where the retention time of gas and liquid is not sufficient. Consequently, gases satisfying the requirements of the present pollution prevention regulations have not been obtained from these processes. In contrast, the process according to this invention extracts $H_2S$ by using organic solvent that dissolves $H_2S$ well. And a chemical reaction to produce sulfur is caused by mixing the organic solvent containing dissolved $H_2S$ and an organic solvent containing dissolved $SO_2$, which makes it possible to provide sufficient reaction time.

In addition to this, the present invention forms a closed cycle by separating unreacted $H_2S$ still dissolved in the solvent, after the completion of the sulfur producing reaction between $H_2S$ and $SO_2$, from the solvent, then oxidizing the $H_2S$ into $SO_2$, redissolving the $SO_2$ in a portion of the recovered solvent. By then extracting $H_2S$ from the gas to be purified using an extracting solvent which can also dissolve $H_2S$ and $SO_2$, mixing the solvent containing dissolved $H_2S$ thus obtained and the solvent containing $SO_2$, and thus allowing $H_2S$ to react with $SO_2$ in the solvents, the cycle is complete. Therefore, $H_2S$ in the gas to be purified is all converted into sulfur that precipitates in the solvent. Also, $H_2S$, $SO_2$ and other sulfur compounds, excepting elemental sulfur do not leave the system of this process. This permits formation of a closed cyclic process wherein $H_2S$ and $SO_2$ are readily adjusted to a stoichiometric molar ratio. This also makes it possible to form an automatically-controlled process.

Since concentrated $H_2S$ gas is used as a source of $SO_2$, useful fuel gases accompanying $H_2S$ and product sulfur are not burnt, in contrast to conventional processes.

Furthermore, water produced with sulfur can be removed simultaneously with the release of unreacted $H_2S$ dissolved in the extracting solvent after the completion of the sulfur producing reaction between $H_2S$ and $SO_2$.

To the extent that the unreacted $H_2S$ exists in step (2), a part of the solvent that has absorbed $H_2S$ in step (1) may be fed to the process (4) as a split flow. Then the same object can be achieved without altering other processes. Also, to the extent that a closed cycle can be formed, that is, to the extent that the unreacted $H_2S$ exists in the step (2), $SO_2$ may be obtained from other sources. In this case too, the same object can be achieved without changing other processes. Furthermore, the object of the invention can be attained by reversing the order of the sulfur separating process (3) and the $H_2S$ removing process (4).

Solvents used for the process are N-methyl-2-pyrrolidone, tetrahydrothiophene 1-1 dioxide, dimethyl sulfoxide, N-alkyl formamides, dialkyl formamides, and alkylene carbonates and their derivatives that dissolve both $H_2S$ and $SO_2$ well. Also mixed solutions prepared by adding to them alkylene glycol, polyalkylene glycol, alkylene glycol ethers, polyalkylene glycol ethers and their derivatives etc. that dissolve $SO_2$ well can be used. Furthermore, those to which such organic bases whose first, second or third pKa is 4 to 12, e.g. aminoalcohols, aliphatic amines, alkylene glycol amines, polyalkylene glycol amines, aromatic amines, aminoacids, and their derivatives etc. are also usable.

BRIEF DESCRIPTION OF THE DRAWING

The accompanying drawing is a flow diagram depicting an embodiment of the process of the present invention.

DESCRIPTION OF THE PREFERRED EMBODIMENT

Now the process of the invention will be described in detail by reference to the accompanying drawing.

The gas 101 that contains hydrogen sulfide produced by hydrogenating desulfurization of petroleum or hydrogen sulfide and a small quantity of sulfur dioxide produced by gasificating desulfurization enters a hydrogen sulfide absorption column 1 where it is desulfurized by contact with solvent from an $H_2S$ stripper 5 and the solvent vapour also is washed and purified in the upper portion thereof and then the $H_2S$-free gas 102 can be used as a fuel. Depending upon the pressure of the $H_2S$ absorption column 1, the solvent emerging therefrom is reduced in pressure and enters a pressure reducing 2. Depending upon the pressure of said absorption column, gases other than $H_2S$ may be released from the solvent, in which event, they are returned to the absorption column 1 by compressor 11. The pressure of the pressure reducing tank 2 is adjusted to an optimum value depending on the relationship between the amount of gases released and the power of said compressor 11. The solvent leaving the pressure reducing tank 2 is revised in temperature by heat-exchanging in a heat-exchanger 23 with the solvent from the $H_2S$ stripper 5 to reduce the temperature differential between the two as much as possible. The solvent leaving the heat-exchanger 23 enters a mixing-reaction tank 3 where it mixes with the solvent from a $SO_2$ absorption column 6 to produce sulfur. The quantity of unreacted $H_2S$ decreases with increasing the quantity of $SO_2$ from said absorption column 6. This change in the quantity of unreacted $H_2S$ corresponds to the change in the concentration of $H_2S$ in the solvent in said mixing tank 3. When the mixing tank 3 is designed with a sufficiently large capacity, this change in $H_2S$ concentration with time takes place slowly, thereby facilitating adjustment of the concentration. The solvent issuing from said mixing tank 3 enters a sulfur settling tank 4, and the sulfur settled goes to a system 103 where sulfur is completely separated and solvent is purified. Clarified solvent from the sulfur settling tank 4 is supplied by a pump 12 to the $H_2S$ stripper 5, combined with the solvent returned from the solvent purifying system 103. The bottom portion of the $H_2S$ stripper 5 is heated by steam 104 to a temperature between 60 and 150°C. $H_2S$ released passes through a cooler 24, and is supplied to a boiler 7 by a vacuum and compression pump 16. The moisture liquefied in said cooler 24 is sent by a pump 15 to the top of the $H_2S$ stripper 5 and a $H_2S$ stripper 9. The water supplied to the top of the $H_2S$ stripper 5 is used for washing the solvent vapour. $H_2S$ released by stream 108 in the $H_2S$ stripper 9 is sent to the boiler 7. The water deprived of $H_2S$ in the $H_2S$ stripper 9 is sent to the top of the hydrogen sulfide absorption column 1 and the top of the $SO_2$ absorption column 6. A part of the solvent at the bottom of the $H_2S$ stripper 5 is sent by a pump 13 through said heat-exchanger 23 and a cooler 22 into said $H_2S$ absorption column 1, while the remainder is sent by a pump 14 through a heat-exchanger 21 and a cooler 25 into said $SO_2$ absorption column 6. On the other hand, the unreacted $H_2S$ generated in the $H_2S$ strippers 5 and 9 is sent to said boiler 7 where it is burnt with air from 105 to produce steam 107. When burning $H_2S$ at high temperature in the boiler 7, burning must be effected with insufficient air so as not to produce $SO_3$. Reference numeral 8 denotes a low-temperature oxidizing equipment provided next to the boiler 7, where substantially no $SO_3$ is produced since $H_2S$ is oxidized under a state with a slight excess of air fed by the split flow from 105. With regard to $SO_2$ and $N_2$ from said low-temperature oxidizing equipment 8, $SO_2$ is absorbed and $N_2$ and other gases are released into the atmosphere from the column top as pollution-free exhaust gas 106, on contacting the solvent inserted from the top of the $SO_2$ absorbing column 6. The solvent that has absorbed $SO_2$ collecting at the bottom of the $SO_2$ absorbing column 6 is sent by a pump 17 to the mixing tank 3.

Since in this system all of unreacted $H_2S$ is converted to $SO_2$ which in turn is absorbed by the solvent, the quantity of gaseous $H_2S$ stored and the quantity of gaseous $SO_2$ in the $SO_2$ absorption column 6 can both be reduced. By designing the capacity of the mixing tank 3 and the sulfur settling tank 4 considerably larger than that of the $SO_2$ absorption column 6, this system can readily result in an automatically controllable process.

By measuring the quantity of $H_2S$ by a measuring device 111 and feeding the information thus obtained to a $H_2S$-air proportional control equipment 118, automatic adjustment is performed at perfect speed, whereby no $SO_2$ exists in the sulfur settling tank 4, thus readily maintaining the quantity of $H_2S$ dissolved as desired.

Because the solvent used is an organic one, the concentrated unnecessary waste can be burnt up in the boiler if no inorganic substance is introduced in the solvent purifying system 103, thereby stamping out secondary pollution from polluted water.

The following is an example of the process according to the present invention:

As the absorbing liquid, an aqueous solution containing 47.5 percent by volumn of triethylene glycol and 47.5 percent by volumn of N-methyl-2-pyrrolidone was used. The $H_2S$ containing gas to be treated had a composition consisting of 60 percent $H_2S$ and 40 percent $N_2$, and was supplied at a rate of 800 Nl per hour. On treating said gas in the absorption column 1 at atmospheric pressure and 35°C and with 40 l. per hour of the absorbing solvent, $H_2S$ in the column top gas was not more than 100 ppm. In the $SO_2$ absorption column 6, treatment was effected at 35°C with 40 l. per hour of the absorbing liquid, and $SO_2$ in the exhaust gas from the column top was not more than 100 ppm. By keeping the temperature at 70°C in the mixing and sulfur settling tanks, sulfur was settled with ease. The solvent emerging from the $H_2S$ stripper 5 was at about 140°C. $H_2S$ in the equilibrium gas phase with this solvent at atmospheric pressure and 30°C was not more than 2 ppm. $SO_2$ also was not exceeding 2 ppm.

According to the $H_2S$ containing gas treatment process of the invention, $SO_2$ and $H_2S$ are allowed to react with each other by mixing in the mixing and reaction tank the solvents that have individually absorbed $H_2S$ and $SO_2$, thereby providing sufficient reaction time. Consequently, sulfur can be recovered in high yield. In the process of this invention, all $H_2S$ in the gas is dissolved in a solvent which is then mixed with another solvent in which $SO_2$ has been dissolved. An excess of $H_2S$ remaining after production of sulfur is completely released and completely oxidized into $SO_2$. A part of the solvent freed of $H_2S$ is used as an $SO_2$ absorbing solvent to completely absorb said $SO_2$. By this means, a closed cycle can be formed that permits the establishment of an automatically controllable process including $H_2S$ and $SO_2$ kept at a molar ration of 2.0.

The quantity of $H_2S$ released from the solvent of the present invention is one-third as compared with the conventional process in which the $H_2S$ containing gas is treated with an aqueous solution of amine to absorb $H_2S$, which is then made into a concentrated solution from which concentrated $H_2S$ gas is released that is, in turn, treated by the Claus furnace process. According to the present invention, therefore, two-thirds of the $H_2S$ to be treated is not released but is changed to sulfur in solvent, which makes it possible to reduce the heat energy required for releasing $H_2S$ to a great degree. Removal of water produced with sulfur in releasing $H_2S$ from the solvent can be conducted at the same time. This also is conducive to reducing the required heat energy.

According to the process of this invention, the solvent having absorbed $H_2S$ is circulated in many portions; in other words, the solvent is neutral or very slightly acidic in many parts. This is very advantageous from the viewpoint of equipment material. In addition to this, selection of material is facilitated because the gas released at high temperature is $H_2S$. This naturally results in cost advantage. Secondary pollution or disposition of waste in purifying solutions is one of the great shortcomings of the wet-type atmospheric pollution prevention system. According to the present invention, concentrated waste can readily be disposed of within the system since no inorganic substance other than sulfur compounds is introduced. That is, this concentrated waste containing sulfur is burned to form $SO_2$ and combustion gas.

What is claimed is:

1. A process for preparing sulfur by continuously removing sulfur compounds from a fuel gas stream containing $H_2S$ or $H_2S$ and a small quantity of $SO_2$, which comprises (1) bringing into contact a fuel gas stream containing $H_2S$ with a stream of organic solvent that dissolves $H_2S$ and $SO_2$ well, so as to remove the $H_2S$ and $SO_2$, if present, from said gas stream (2) mixing most or all of the solvent stream discharged from step (1) and a stream of organic solvent containing $SO_2$, the amount of $SO_2$ contained in said solvent being stoichiometrically less than that of $H_2S$ in the mixed solvent, under reaction conditions so selected as to produce elemental sulfur and a stream of organic solvent containing dissolved unreacted $H_2S$, and retaining the mixed streams for a time sufficient to insure that substantially no unreacted $SO_2$ remains within the stream of organic solvent; (3) separating the solvent stream containing dissolved $H_2S$ of step (2) from the elemental sulfur; (4) separating the organic solvent stream containing dissolved $H_2S$ from step (3) into a stream of gas containing $H_2S$ and a stream of organic solvent free of $H_2S$ and returning a part of said organic solvent stream free of $H_2S$ to step (1); (5) oxidizing the gas stream containing $H_2S$ from step (4) under oxidizing conditions so as to produce $SO_2$; and (6) contacting the gas stream containing $SO_2$ from the step (5) with a part of the organic solvent free of $H_2S$ from step (4) to produce a stream of purified gas free of $SO_2$ and a stream of organic solvent containing dissolved $SO_2$ which solvent stream is returned to step (2).

2. A process according to claim 1 wherein the fuel gas containing $H_2S$ is from the hydrogenating desulfurization of petroleum.

3. A process according to claim 1, wherein the fuel gas containing $H_2S$ and a small quantity of $SO_2$ is from the gasificating desulfurization of petroleum.

* * * * *